United States Patent
Feldman

[11] 3,734,599
[45] May 22, 1973

[54] OPTICAL RASTER-TO-LINE CONVERTER

[75] Inventor: Martin Feldman, Springfield, N.J.

[73] Assignee: Bell Telephone Laboratories, Incorporated, Murray Hill, N.J.

[22] Filed: Nov. 9, 1971

[21] Appl. No.: 196,994

[52] U.S. Cl. ................... 350/190, 350/167, 350/181
[51] Int. Cl. ....................... G02b 3/06, G02b 27/00
[58] Field of Search ..................... 350/167, 181, 213, 350/190; 352/58

[56] References Cited
UNITED STATES PATENTS
2,021,162    11/1935    Walton .......................... 350/181 UX

*Primary Examiner*—John K. Corbin
*Attorney*—W. L. Keefauner

[57] ABSTRACT

A two-dimensional matrix array of light beams is translated into a linear array having the same number of spots. This is accomplished by an optical converter that comprises a cylindrical lenslet plate crossed, not quite orthogonally, with a single cylindrical lens. Each column of the matrix array of light beams is imaged by the converter to form a segment of the final line array.

6 Claims, 6 Drawing Figures

PATENTED MAY 22 1973 3,734,599

OPTICAL RASTER-TO-LINE CONVERTER

This invention relates to the selective translation of light beams and more particularly to an apparatus for converting a two-dimensional matrix array of light beams into a linear array of spots.

BACKGROUND OF THE INVENTION

The need for generating a line array comprising a large number of resolvable light spots arises in a number of applications of practical importance. The reliability low cost and modest drive requirements of acousto-optic deflectors make them especially attractive choices for generating such lines. Unfortunately, however, the number of resolvable positions required often exceeds substantially the capacity of presently available acousto-optic deflectors.

It is known that the number of resolvable light spots obtainable by acousto-optic techniques can be increased by cascading two orthogonally disposed acousto-optic deflectors. However, the beams generated by such an arrangement form a rectangular matrix array or raster. Accordingly, in pursuing this particular approach, some form of converter is needed for translating the raster to a line array of spots.

Such raster-to-line converters are known. For example, in a copending application of M. Feldman and J. P. Griffin, Ser. No. 39,583, filed May 22, 1970, now U.S. Pat. No. 3,627,405 there is described a series of mirrors arranged to form a staircase which converts a rectangular matrix of light beams to a close approximation of a linear array of spots. Other specific schemes, utilizing, for example, optical fibers, mirrors, or multifaceted prisms, have been suggested for carrying out the noted conversion.

SUMMARY OF THE INVENTION

An object of the present invention is an improved optical converter.

More specifically, an object of this invention is an improved optical raster-to-line converter that is characterized by simplicity, reliability, low cost and ease of alignment.

Briefly, these and other objects of the present invention are realized in a specific illustrative embodiment thereof that comprises a multi-element cylindrical lenslet plate crossed, not quite orthogonally, with a single cylindrical lens. Such an arrangement is adapted to translate a two-dimensional matrix array of light beams into a linear array having the same number of spots. Each column of the matrix array of light beams is directed to a different element of the lenslet plate and is imaged to form a segment of the final line array. In particular, if each column of $n$ light beams of an $m$-by-$n$ input array is directed to fall along the main axis of a different one of $m$ cylindrical lenses of the lenslet plate, the $n$ beams of each input column will be imaged into a row of $n$ smaller spots along a horizontal line parallel to the axis of the single cylindrical lens.

DETAILED DESCRIPTION

Figure 1:
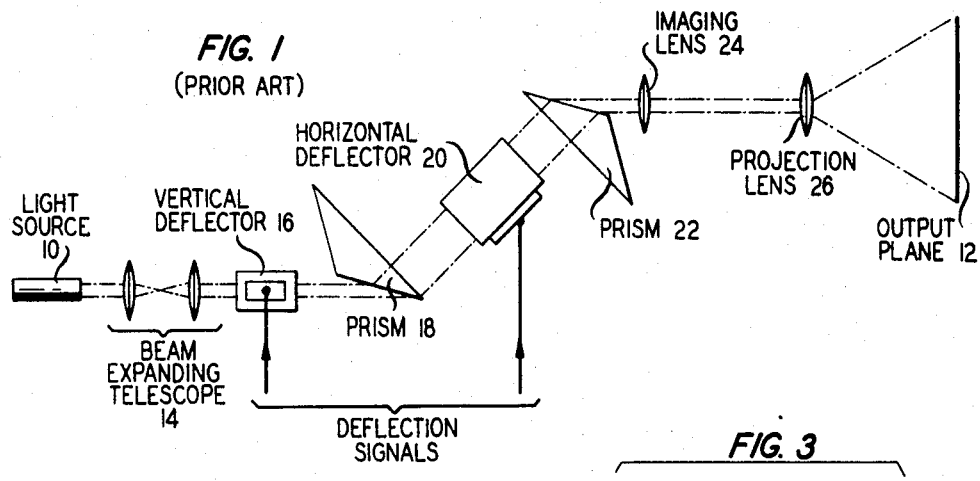
FIG. 1 shows a prior art system for generating a two-dimensional raster of light beams.

The prior art system shown in FIG. 1 is adapted to deflect a light beam provided by source 10 to successive ones of a plurality of target areas in output plane 12. The target areas in plane 12 are arranged to form a two-dimensional array or raster having plural rows and columns.

The source 10 of FIG. 1 comprises, for example, an argon ion laser which supplies light at 4,880 A. Illustratively, the output of the source 10 is a collimated light beam with a circular cross-section which is typical of a laser operating in the $TEM_{oo}$ transverse mode. Other types of sources, such as, for example, expanded or contracted laser beams, higher-order laser beams, collimated and/or filtered arc discharges or other light sources, also may be employed to provide a light beam to be deflected by the depicted system.

The relatively small diameter of the light beam supplied by the source 10 of FIG. 1 is increased by a conventional beam-expanding telescope 14 before the beam is applied to a conventional vertical deflector 16. The deflector 16 may, for example, be of the acousto-optic type. (The phenomenon underlying the mode of operation of acoustooptic deflectors is described by E. I. Gordon in the Proceedings of the IEEE, October, 1966, pages 1,391–1,401.) Thereafter, the vertically deflected beam propagates through a prism 18 which further enlarges its diameter before the beam enters a conventional horizontal deflector 20 which also may be of the acousto-optic type. In this way, relatively high horizontal resolution is obtained. The cascaded deflectors 16 and 20, one rotated approximately 90° with respect to the other, constitute a conventional x-y deflection arrangement.

Another prism 22 (FIG. 1) disposed in the path of the propagating light is effective to increase the angular deflection of the beam. An imaging lens 24 and a lens 26 serve to project the deflected beam onto the output plane 12. Illustratively, the raster formed thereby is characterized by a large aspect ratio (i.e., a large width-to-height ratio). This characteristic is achieved as a result of the action of the prism 22.

Figure 2:
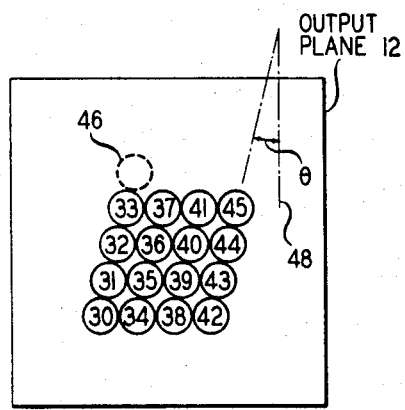
FIG. 2 depicts a particular tilted raster of light beams of the type adapted to be converted to a line array by an embodiment of the principles of the present invention.

Prior art systems, whether they are of the particular type shown in FIG. 1 or variations thereof, are generally designed to deflect an incident light beam to a rectangular matrix array of target areas. In accordance with the principles of the present invention, however, such a system is specifically adapted to produce a two-dimensional array of light spots whose columns are slightly tilted from the vertical. This tilted effect is achieved, for example, simply by successively increasing the amount of horizontal deflection during the time of each vertical sweep. An illustrative such tilted array, comprising 16 target areas 30 through 45 disposed in output plane 12, is represented in FIG. 2. (The significance of the dashed-line circle 46 will be discussed later below.) In FIG. 2, the columnar axes are each parallel to each other and form an angle θ with vertical line 48.

The particular mechanism employed to form a tilted raster of the general type represented in FIG. 2 is unimportant. However formed, such a raster is adapted to be converted by an embodiment made in accordance with this invention into a line array of target areas.

Figure 3:
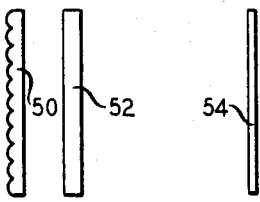
FIG. 3 is a top cross-sectional view of a specific illustrative converter made in accordance with the principles of this invention.
Figure 4:
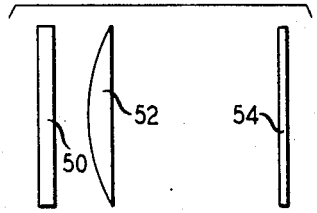
FIG. 4 is a side view of the FIG. 3 converter.

The specific illustrative converter shown in FIGS. 3 and 4 includes a multi-element lenslet plate 50. An optical raster to be converted is directed to impinge on the left-hand or input face of the plate 50. Each element of the plate is a cylindrical lens having a focal length $f$. Such plates, made, for example, of plastic, are commercially available. Spaced apart from the plate 50 and confocal with it is a conventional horizontal cylindrical lens 52. Illustratively, the element 52 is a single horizontal plano-convex cylindrical lens. To provide physical clearance between the elements 50 and 52, the focal length of the lens 52 is assumed to be approximately $0.9\,f$. A utilization device 54, for example a screen, is positioned in alignment with the elements 50 and 52.

Figure 5:
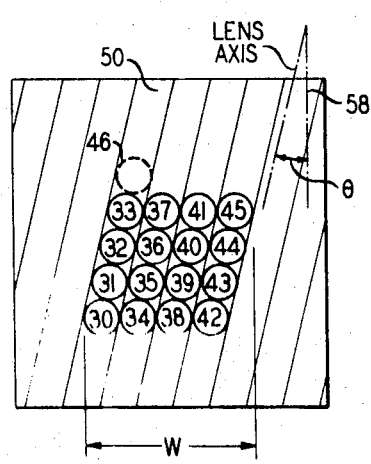
FIG. 5 is a front view of the FIG. 3 converter with the FIG. 2 raster superimposed thereon.

FIG. 5, which shows a front view of the converter of FIGS. 3 and 4, indicates the relative alignment on the input face of the lenslet plate 50 of an optical raster to be converted. The depicted raster is identical to that illustrated in FIG. 2.

As indicated in FIG. 5, the main longitudinal axis of each one of the cylindrical lenses formed on the plate 50 is tilted at an angle θ with respect to vertical line 58. This angle is the same as the aforementioned angle of tilt of the respective columns of the input raster. Moreover, the $n$ light spots in each different one of the $m$ input columns are advantageously centered on a corresponding one of the tilted main axes of the lenses on the plate 50.

For illustrative purposes, the target areas in each column of the raster shown in FIGS. 2 and 5 are depicted as being tangent to each other. Each input column of tangent light beams, when projected onto the output device 54 (FIGS. 3 and 4), constitutes a segment of the final line array. For tangent input beams, the corresponding line segment also consists of tangent beams. (But as discussed below, the beams or spots in the line array are reduced in size relative to the input beams.) Thus, for example, the input column comprising beams 30 through 33 (FIG. 5) is imaged onto the device 54 to form four output spots that are tangent to each other along the leftmost portion of a horizontal output line. From left to right, looking at the device 54 from the lens 52, the spots that comprise this leftmost portion are derived respectively from the input beams designated 30, 31, 32 and 33.

Figure 6:
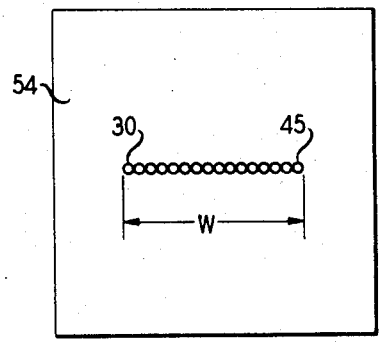
FIG. 6 shows the line array which is formed by the FIG. 3 converter in response to having the FIG. 2 raster directed thereat.

For many applications of practical interest, it is desired that all the light spots in the final array provided by a converter made in accordance with this invention be equally spaced along a horizontal line. To achieve this result with the particular input raster represented in FIG. 5, it is accordingly necessary that the various line segments corresponding to the respective columns of the input raster be imaged on the output device 54 tangent to each other. In other words, referring to FIG. 5, it is desired that the rightmost beam 33 of the leftmost portion of the final line array be tangent to the beam 34. Similarly, it is desired that the beams 37 and 38, and 41 and 42, be respectively tangent to each other in the line array. If this is achieved, the final array comprises sixteen tangent reduced-size spots 30 through 45 arranged in a line from left to right on the output device 54, as depicted in FIG. 6.

It is a simple matter to design the format of the particular input raster shown in FIGS. 2 and 5 to insure that the segments of the final line array will be tangent to each other. This is accomplished by assuming for design purposes only that the $n$ beams 30 through 33 in the leftmost input column of the raster include another in-line target area, represented by the dashed-line circle 46. The axis along which the areas 30 through 33 and 46 lie is then tilted until the bottom beam 34 in the next parallel input column lies directly (i.e., vertically) under the area 46. If this specific angle of tilt is established for each of the input columns, the corresponding line segments on the device 54 will be exactly tangent to each other. In this way, a two-dimensional array of tangent input beams is imaged to form a line of tangent beams. If the input beams are resolved, their reduced images on the device 54 are also resolved.

The described converter exhibits an in-line characteristic in that the width W of the final line array (see FIG. 6) is the same as the width W (FIG. 5) of the incident raster and in addition is located directly downstream from the input array.

As indicated above, the spots included in the output line array are reduced in size relative to the beams in the input raster. More specifically, the reduction may be expressed approximately as $d \sin \theta$, where θ is defined above and $d$ is the diameter of a beam in the input array.

Moreover, if the beams in the input raster are spaced apart (not tangent), the spacing between adjacent ones of their converted images in the final line array will be reduced approximately by the factor $\sin \theta$.

A practical advantage of the aforedescribed converter is that the alignment of the output optical elements is not critical. This arises from the fact that the final image produced by the arrangement is formed relatively close to the elements 50 and 52.

Alignment of the input optical elements included in the overall system is also relatively noncritical. This is so because the cylindrical lenses included therein demagnify the images. As a result, input alignment is done on an appreciably larger scale than the spot size of the final line array.

In order to reduce aberrations and minimize diffraction-spreading effects, it is advantageous in some applications to use an elliptically shaped beam to form the input raster to be applied to a converter of the type described herein. If elliptically shaped incident beams are used, the images formed on the output device 54 are ellipses of the same eccentricity rotated by $\pi/2 - \theta$. No loss in resolution results from the use of such beams. Moreover, if the incident elliptically shaped beams are tangent, the imaged ellipses in the final line array are tangent also.

The number of columns in a raster to be applied to a converter made in accordance with this invention is limited by the capacity of the horizontal deflector included in the x - y deflection system. The number of spots per column is limited by the capacity of the vertical deflector and also by diffraction and aberrations in the single cylindrical lens 52. These aberrations can be minimized by grinding the lens 52 to form an acylindrical surface, thereby to provide more accurate off-axis focusing. Alternatively, a compound cylindrical lens or a parabolic mirror can be used in place of the element 52 to provide better focusing and also to demagnify the height of the spots in the final line array.

It is to be understood that the above-described arrangements are only illustrative of the principles of the present invention. In accordance with these principles, numerous other configurations may be devised by those skilled in the art without departing from the spirit and scope of this invention.

I claim:

1. An optical arrangement for reordering a matrix array of rows and columns of light spots into a corresponding linear array of light spots, said arrangement comprising:

a light beam directed to any one of a first plurality of target areas arranged in said matrix array of rows and columns, said columns being aligned at a predetermined angle $\theta$ other than the perpendicular with respect to said rows; and means, interposed in the path of said beam and following said matrix array, for redirecting said beam from any given one of said first target areas to a corresponding one of an equal number of second nonoverlapping target areas disposed in a linear array, said redirecting means comprising plural cylindrical lenses, each of said lenses being aligned parallel with a different column of said matrix array and being configured to reduce the images of the target areas in the column in a direction perpendicular to said column, and a cylindrical focusing lens positioned in the path of said beam between said plural cylindrical lenses and said linear array of second target areas, said focusing lens being aligned parallel with respect to said rows of first target areas to reduce the dimensions in a direction perpendicular to said rows of each column of the images of said second target areas and in cooperation with said plural cylindrical lenses to project said images into said linear array of second target areas.

2. The arrangement in accordance with claim 1 in which said linear array is aligned parallel with the rows of said matrix, and said cylindrical focusing lens and said plural cylindrical lenses are confocal with respect to said second target areas.

3. The arrangement in accordance with claim 2 in which said first target areas have a substantially round geometry, and said second target areas and the images projected onto said second target areas of said linear array have a substantially round geometry, said images and said second target areas having a diameter reduced by approximately the factor sin $\theta$ with respect to the diameter of said first target areas.

4. The arrangement in accordance with claim 3 in which said first target areas are tangential to one another only at points along lines parallel with said rows and columns and passing through the geometric centers of such target areas, and said second target areas are tangential to one another only at points along a line passing through the geometric centers of said second target areas.

5. The arrangement in accordance with claim 3 in which said plural cylindrical lenses are formed on a multielement cylindrical lenslet plate.

6. The arrangement in accordance with claim 1 in which each of said plural cylindrical lenses is configured to reduce a matrix area image dimension in a direction perpendicular to said columns to the dimension, in the same direction, of a linear array target area; and said cylindrical focusing lens is configured to reduce a matrix column image dimension, in a direction perpendicular to said rows, to the dimension, in the same direction, of a linear array target area.

* * * * *